United States Patent [19]
Kosik et al.

[11] Patent Number: 5,993,352
[45] Date of Patent: Nov. 30, 1999

[54] CLUTCH ASSEMBLY WITH CONTROL DEVICE WHICH DETERMINES ADAPTED GRIPPING POINT AND GRADIENT OF CLUTCH CHARACTERISTIC CURVE

[75] Inventors: Franz Kosik, Ostfildern; Thomas Grass, Urbach, both of Germany

[73] Assignee: Daimler-Benz AG, Germany

[21] Appl. No.: 08/893,522

[22] Filed: Jul. 11, 1997

[30]     Foreign Application Priority Data

Jul. 25, 1996  [DE]  Germany .......................... 196 30 014

[51] Int. Cl.$^6$ .................................................. F16D 43/00
[52] U.S. Cl. .............................. 477/74; 477/73; 477/174; 192/3.63; 192/111 A
[58] Field of Search .................... 192/3.63, 3.62, 192/3.55, 109 F, 218, 54.1, 111 A, 103 R; 477/73, 74, 174, 86, 83

[56]             References Cited

U.S. PATENT DOCUMENTS

| | | | |
|---|---|---|---|
| 5,065,851 | 11/1991 | Otsuka et al. ........................ | 192/111 A |
| 5,176,234 | 1/1993 | Reik et al. .............................. | 477/74 X |
| 5,322,150 | 6/1994 | Schmidt-Brucken et al. ....... | 477/175 X |
| 5,393,274 | 2/1995 | Smedley et al. ................. | 192/111 A X |
| 5,624,350 | 4/1997 | Bates ................................... | 192/3.63 X |
| 5,632,706 | 5/1997 | Kremmling et al. ..................... | 477/74 |

FOREIGN PATENT DOCUMENTS

| | | |
|---|---|---|
| 40 11 850 A1 | of 0000 | Germany . |
| 41 00 372 A1 | of 0000 | Germany . |
| 44 26 260 A1 | of 0000 | Germany . |
| 44 34 111 A1 | of 0000 | Germany . |
| DE 40 11 850 A1 | 10/1990 | Germany . |
| DE 44 26 260 A1 | 2/1995 | Germany . |
| 0 410 346 A1 | 1/1991 | United Kingdom . |

*Primary Examiner*—Charles A Marmor
*Assistant Examiner*—Ankur Parekh
*Attorney, Agent, or Firm*—Evenson, McKeown, Edwards & Lenahan, P.L.L.C.

[57]             ABSTRACT

An automatically controlled clutch is arranged between the engine and the driving wheels in the transmission line of a motor vehicle having a transmission which can be shifted manually in an arbitrary manner between idling and driving positions. A control device used for operating the clutch constantly determines the operating performance of the clutch and stores correspondingly adapted characteristic values.

6 Claims, 1 Drawing Sheet

CLUTCH ASSEMBLY WITH CONTROL DEVICE WHICH DETERMINES ADAPTED GRIPPING POINT AND GRADIENT OF CLUTCH CHARACTERISTIC CURVE

BACKGROUND AND SUMMARY OF THE INVENTION

This application claims the priority of 196 30 014.2, the disclosure of which is expressly incorporated by reference herein.

The present invention relates to an automatically controlled clutch which is arranged between the engine and the driving wheels in the transmission line of a motor vehicle having a transmission which can be shifted arbitrarily and manually between idling and driving positions. A control device operates a clutch actuating assembly as a function of given parameters sensed by an assigned sensing system.

Motor vehicles having automatic clutches are known and are produced as standard models. In comparison to vehicles having a clutch to be operated by the driver, an increased comfort is offered. In combination with conventional, manually shifted mechanical transmissions, only extremely low power losses must be accepted in the driving operation so that also comparatively low-power vehicles can be used with automatic clutches. The operating performance of the known automatic clutch is subjected to constant changes which are caused, for example, by changing temperatures as well as setting and wear phenomena. An object of the invention to ensure an operating performance of the automatic clutch which is as constant as possible.

According to the present invention, this object achieved by providing that the signals of the sensing system reflect the actuating path of the actuating assembly as well as the torque of the engine, and indicate whether the vehicle is stopped, whether the service brake is operated and whether a or which driving position is engaged. A control device sets the clutch, while the vehicle is stopped and the driving position is simultaneously engaged and the service brake is operated, at least temporarily to its present gripping point and stores an adapted gripping point actuating stroke which corresponds to the previous gripping point actuating stroke plus a given larger fraction of the deviation between the previous gripping point actuating stroke and the actuating stroke which occurred during the setting of the present gripping point.

The present invention is based on the concept of letting the control device operate with a continuously adapted gripping point actuating stroke so that the control device "knows" sufficiently precisely when the clutch starts to grip during the engaging or has almost opened during the disengaging. During the adaptation according to the present invention it is, on one hand, it is also account that, particularly as a result of temperature influences, fairly large changes of the gripping point actuating stroke may occur relatively frequently. On the other hand, it is also taken into account that the direction of the changes can be altered. In that now, during the adaptation, in each case, only a fraction, for example, half of the deviation between the previously stored gripping point actuating stroke and an actually implemented gripping point actuating stroke is taken into account, a fast adaptation can be achieved during changes of the gripping point position with an alternating direction as well as during changes with a constant direction. As a result, the respective stored gripping point actuating stroke is situated in a narrow tolerance band close to the optimum.

According to a currently preferred embodiment of the present invention, the control device stores continuously adapted data which reflect the dependence of the torque transmitted by the clutch on the actuating stroke of the actuating assembly. That is, the control device therefore "knows" the characteristic curve between the actuating stroke and the clutch torque. This characteristic curve is essentially determined by its gradient (slope) as well as by the position of the gripping point.

According to the present invention, the gradient can be determined during the change of a driving position and the resulting automatically occurring engaging and disengaging of the clutch because the torque transmitted by the clutch is determined by the torque generated by the engine as well as the time variation of the rotational speed of the engine. If now, during a change of the actuating stroke, the torque of the engine as well as the time variation of the rotational speed of the engine are recorded, a value can in each case be determined for the above-mentioned gradient.

The present invention allows an adaptation here to be carried out which is similar to that of the gripping point determination. The adapted value of the gradient to be stored will then in each case correspond to the last-stored value of the gradient plus a given larger fraction of the deviation between the actual value of the gradient and the previously stored value. In this manner, when controlling the clutch, the control device can continuously take into account an updated characteristic curve between the actuating stroke and the clutch torque.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
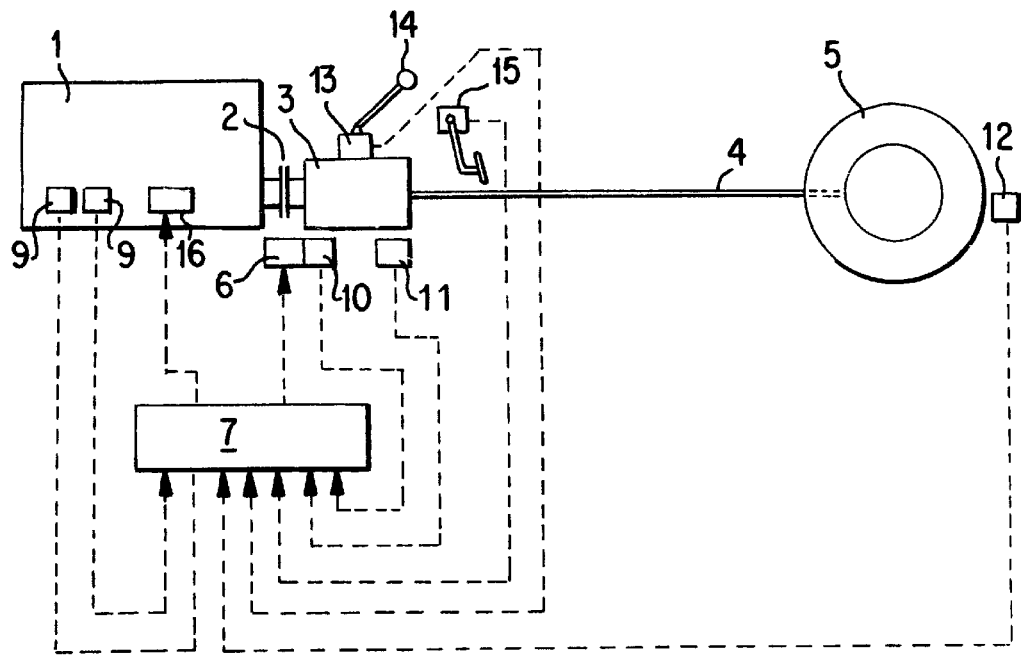
FIG. 1 is a diagrammatic view of the transmission line of a motor vehicle.

According to FIG. 1, a motor vehicle engine 1 can be connected to the drive by an automatically controlled clutch 2 as well as a manually shiftable transmission 3 and a drive shaft 4, such as a cardan shaft, with driving wheels 5.

For operating the clutch 2, a motor-driven actuating assembly 6 is used which is operated by a control device 7 as a function of multiple parameters sensed by a corresponding sensing system connected with the control device 7 on the input side. This sensing system comprises engine-side sensors 9 whose signals indicate the rotational speed of the engine as well as the respective operative torque $M_M$. A sensor 10 is assigned to the actuating assembly 6 and senses the actuating stroke s of the actuating assembly 6. A transmission-side sensor 11 records whether the transmission 3 is shifted to idling or which driving position is engaged. Wheel-side sensors 12 determine the rotational speed of the vehicle wheels.

A sensor arrangement 13, which may interact, for example, with the shift lever 14 of the transmission 3, is able to recognize whether the driver wants to shift the transmission 3. In addition, a sensor 15 whose signals indicate a brake operation is assigned to the operating element (pedal) of the service brake (not shown).

In order to permit a comfortable opening and closing of the clutch 2 when changing the driving position or starting or stopping the vehicle, the control device 7 is constructed such that it will be able to control the torque to be transmissible by the clutch 2 corresponding to a given rise or fall. In this context, it is important that the control device 7 "knows" which value the torque $M_K$ which can be transmitted by the clutch has for the respectively set actuating stroke s of the actuating assembly 6.

Figure 2:
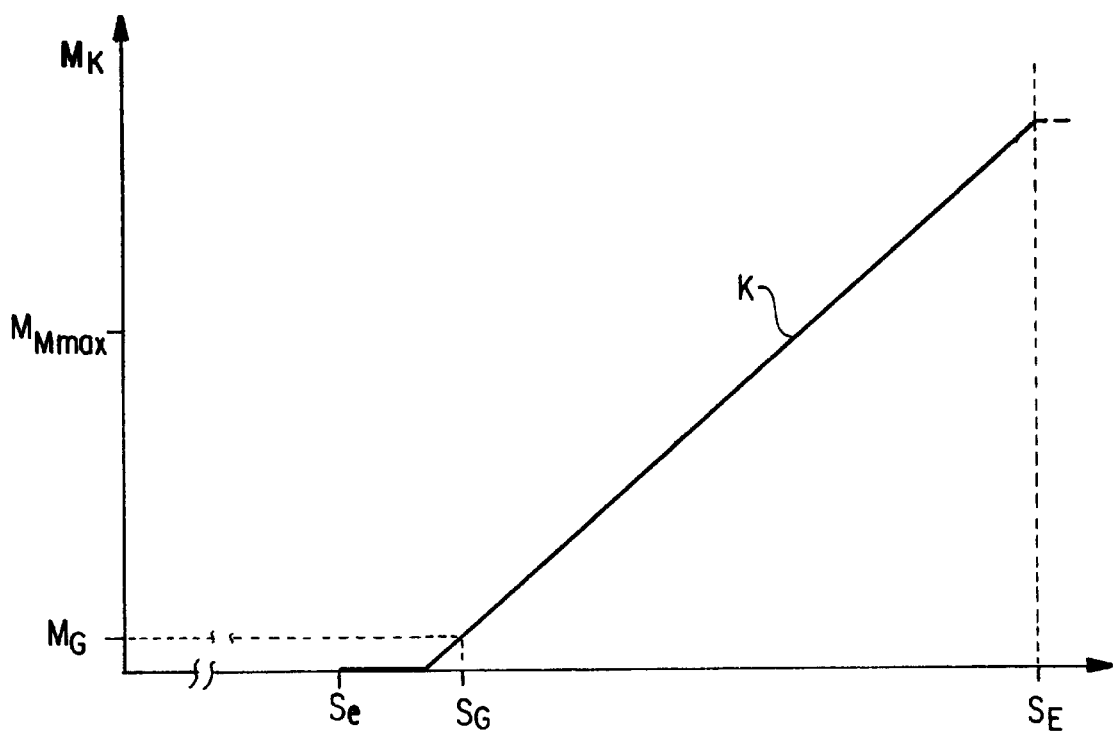
FIG. 2 shows a relationship of the torque which can be transmitted by the clutch as a function of the actuating stroke of the actuating assembly.

As an example, FIG. 2 now shows the dependence of the transmissible clutch torque $M_K$ on the actuating stroke s. According to a curve K, in an end position $s_E$, a maximal transmissible torque is reached which is clearly above the maximal torque $M_{Mmax}$ of the vehicle engine 1. In the opposite end position $s_e$ of the actuating assembly 6, the clutch 6 is completely open so that no torque can be transmitted.

When the actuating assembly 6 is moved from its end position $s_e$ in the direction of the other end position $s_E$, in an actuating stroke $s_G$, the gripping point of the clutch 2 is reached. That is, the clutch 2 is able to transmit a very low torque $M_G$ of, for example, 6 Nm. During a further adjustment in the direction of the end position $s_E$, the transmissible torque of the clutch 2 will rise for the most part in a linear fashion.

As a result of wear, settling phenomena and particularly temperature influences, the conditions represented by the curve K can also change on a short-term basis relatively clearly. Consequently, the position of the gripping point can change, on one hand, and the gradient of the curve K between the gripping point and the adjustment for the maximally transmissible torque can, on the other hand, change.

According to the present invention, the control device 7 continuously determines and stores values or data characteristic of the curve K so that the control device 7 can operate according to a constantly adapted characteristic curve K.

When determining the data characteristic of the characteristic curve K, the fact is utilized that the following applies to the torque $M_K$ which is, in each case, transmitted by the clutch:

$$M_K = M_M - J d\omega/dt$$

wherein $M_M$ is the torque in each case generated by the engine; J is the moment of inertia of the engine; $\omega$ is the rotational speed of the engine; and t is the time.

First, the manner in which control device 7 can determine the gripping point position is now explained. The gripping point determination takes place as soon as the vehicle, while the driving position is engaged, by operating the service brake, is kept in the stopped condition. This operating condition can be recognized by signals of the sensor 15 indicating the brake operation as well as by the signals of the transmission-side sensor 11 and of the wheel-side sensors 12. Now the rotational speed of the engine will be controlled by the control device 7 by an intervention into the engine timing 16 to a predetermined value, such as the rotational idling speed. Simultaneously, the actuating assembly 6 is operated such that the clutch 2 will start to grip and the engine 1 must operate against the low gripping torque $M_g$. Because the rotational engine speed remains constant and correspondingly the time variation of the rotational speed d/dt has the value 0, the following applies $$M_{K=MM}.$$

The respectively generated torque of the engine can be determined from signals of the sensors 9. Thereby, the actuating assembly 6 can be adjusted such that the moment $M_K$ transmitted by the clutch as well as the torque $M_M$ generated by the engine have the value $M_G$. The sensor 10 will then supply the signal for the actuating path $S_G$ assigned to gripping point of the clutch, that is, the gripping point position of the actuating assembly 6.

If, during driving of the vehicle, a driving position is changed and correspondingly the clutch 2 is first opened up and then closed again, the transmissible torque $M_K$ which in each case is just being set at the clutch 2 can be determined from the signals of the sensors 9 reflecting the respective torque of the engine 1 as well as its rotational speed change. Simultaneously, the respective actuating paths of the actuating assembly 6 are sensed by analyzing the signals of the sensor 10. As a result, the ratio between the actuating path change and the change of the torque transmitted by the clutch 2, that is, the gradient of the curve K, can be determined.

First given values for the actuating stroke $s_G$ assigned to the gripping point as well as the gradient of the curve K are stored in the control device 7. If now, during the next gripping point determination, a value is determined which deviates therefrom, the control device 7 will correct the stored value by a given fraction of the deviation greater than or equal to one-half the deviation. Preferably, the given fraction is half the deviation. During the next gripping point determination, this adaptation is repeated. That is, should during the last gripping point determination, a deviation again occur with respect to the last-stored value of $s_G$, the last-stored value is again corrected by half the deviation, and so on.

A basically identical approach is contemplated during the adaptation of the value stored for the gradient. If the respective last determination of the gradient results in a value deviating from the stored value, the stored value is corrected by half the deviation, and so on. In this manner, a fast adaptation is also ensured in the case of larger changes of the gripping point and/or the gradient, specifically independently of whether the adaptations must be carried out several times in one direction or in alternating directions.

In order to avoid excessive adaptations as a result of possible measuring errors, it may be provided to limit the adaptation which is in each case maximally possible in one step. It may, for example, be provided that the value of the actuating stroke $s_G$ assigned to the gripping point during an adaptation step is changed by no more than 0.2 mm.

As a result, the control device 7 constantly "knows" a curve K which comes close to the actual characteristic curve concerning the dependence of the torque $M_K$ transmissible by the clutch 2 on the actuating path S. In particular, the control device 7 "knows" very precisely with which actuating stroke $s_G$ the gripping point is reached. Thus, it is possible that the control device 7 can adjust given clutch torques with a high precision although the operating performance of the clutch 2 and of the assigned actuating assembly 6 can change constantly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An automatically controlled clutch assembly arranged between an engine and driving wheels in a motor vehicle transmission line having a transmission which can be shifted arbitrarily and manually between idling and driving positions, comprising a clutch, a control device which operates an actuating assembly of the clutch and which operates as a function of given parameters sensed by an assigned sensing system, signals of the sensing system representing the actuating stroke of the actuating assembly as well as the rotational speed and the torque of the engine and indicating whether the vehicle is stopped, a service brake is operated and a driving position is engaged, and, when the vehicle is stopped and the driving position is simultaneously engaged and the service brake is operated, the control device operates the engine at a constant rotational speed with a given low torque and adjusts the clutch at least temporarily to a present gripping point, wherein the control device stores an adapted gripping point actuating stroke which corresponds to a sum of a previously stored gripping point actuating stroke and a given fraction of a deviation between the previously stored gripping point actuating stroke and the actuating stroke corresponding to said present gripping point, said given fraction being greater than or equal to one half of said deviation.

2. The clutch according to claim 1, wherein the fraction is in the order of half the deviation.

3. A clutch assembly arranged between an engine and driving wheels in a motor vehicle transmission line having a transmission which can be shifted arbitrarily and manually between idling and driving positions, comprising a clutch, a clutch operating assembly, and a control device configured to operate the clutch actuating assembly as a function of given parameters sensed by a sensing system operatively connected with the control device, wherein signals of the sensing system represent an actuating stroke of the actuating assembly and engine torque, and indicate a condition of vehicle stoppage, service brake operation and driving position engagement, and with vehicle stoppage and simultaneous driving position engagement and service brake operation, the control device adjusts the clutch at least temporarily to a present gripping point and stores an adapted gripping point actuating stroke which corresponds to a sum of a previously stored gripping point actuating stroke and a given fraction of a deviation between the previously stored gripping point actuating stroke and an actuating stroke corresponding to the present gripping point, said given fraction being greater than or equal to one half of said deviation, wherein a present ratio between a change of the actuating stroke of said actuating assembly and change of a torque transmissible by the clutch is determined when, during a change of a driving position of said driving positions, an automatic engagement and disengagement takes place, and an adapted value corresponding to the sum of the previous stored value of the ratio between said change of said actuating stroke and said change in said torque transmissible by said clutch and a given fraction of a deviation between said previously stored value of said ratio and the value of said present ratio.

4. The clutch according to claim 3, wherein the fraction is in the order of half the deviation.

5. A clutch assembly arranged between an engine and driving wheels in a motor vehicle transmission line having a transmission which can be shifted arbitrarily and manually between idling and driving positions, comprising a clutch, a clutch operating assembly, and a control device configured to operate the clutch actuating assembly as a function of given parameters sensed by a sensing system operatively connected with the control device, wherein signals of the sensing system represent an actuating stroke of the actuating assembly and engine torque, and indicate a condition of vehicle stoppage, service brake operation and driving position engagement, and with vehicle stoppage and simultaneous driving position engagement and service brake operation, the control device adjusts the clutch at least temporarily to a present gripping point and stores an adapted gripping point actuating stroke which corresponds to a sum of a previously stored gripping point actuating stroke and a given fraction of a deviation between the previously stored gripping point actuating stroke and an actuating stroke corresponding to said present gripping point, said given fraction being greater than or equal to one half of said deviation, wherein a respective change of said adapted gripping point actuation stroke is limited to a given maximal value.

6. The clutch according to claim 5, wherein a ratio is determined between a change of the actuating path of the actuating assembly and change of the torque transmissible by the clutch when, during a change of a driving position, an automatic engagement and disengagement takes place, and an adapted value corresponding to the sum of the previous stored value and a given fraction of the deviation with respect to the actually determined value, is stored for the determined ratio.

\* \* \* \* \*